United States Patent [19]
Benoit et al.

[11] 3,797,273
[45] Mar. 19, 1974

[54] ADJUSTABLE BED MOTOR MOUNT
[75] Inventors: Roland A. Benoit; Edmond P. Guillot, both of Danielson, Conn.
[73] Assignee: Interroyal Corporation, New York, N.Y.
[22] Filed: June 1, 1972
[21] Appl. No.: 258,861

[52] U.S. Cl............................. 64/4, 5/66, 5/109, 248/14
[51] Int. Cl. ............................................. F16c 1/06
[58] Field of Search............ 64/4, 3; 5/109, 108, 66; 248/14

[56] References Cited
UNITED STATES PATENTS
| | | | |
|---|---|---|---|
| 2,998,215 | 8/1961 | Brown | 248/14 |
| 3,261,033 | 7/1966 | Martin | 5/109 |
| 3,311,935 | 4/1967 | Petty | 5/109 |

*Primary Examiner*—Benjamin W. Wyche
*Assistant Examiner*—Randall Heald
*Attorney, Agent, or Firm*—Arthur A. March

[57] ABSTRACT

A motor mount, particularly for hospital beds, includes a motor unit equipped with a splined male powered shaft which coacts with a female splined socket which is mounted at a bed motor mounting. The socket is rotatably mounted on a mounting member of the bed frame and is connected to a rotatable part which activates the moving parts of the bed. The splined shaft supports the motor unit which is held against rotation by a slot in a cross frame member and against end play by a spring clip attached to the frame. A plurality of motor units are positioned in a console cabinet in a head or foot board. The console contains operational switches for an attendants use and a master disconnect switch which operates when the cabinet door is completely opened to render safe access to motor servicing and the like. The motor mounting includes a gear housing with an output shaft which is connectable to the female splined socket. The gears in the housing are selectably driven by one of a plurality of different motors or by a hand crank which is connectible to an external crank fitting of the housing.

8 Claims, 5 Drawing Figures

3,797,273

ADJUSTABLE BED MOTOR MOUNT

BACKGROUND OF THE INVENTION

1. FIELD OF THE INVENTION

This invention relates in general to a motor mounting means and, in particular, to a new and useful motor mount for readily connecting a drive motor to the drive of hospital beds and to a control console containing a plurality of said motor units which are separately controllable.

2. DESCRIPTION OF THE PRIOR ART

Motor units for driving movable parts of hospital beds and corresponding mounting means are known, but a disadvantage of known arrangements is that they are of complicated construction and expensive. A further disadvantage of known arrangements is that in the event of a power failure with known consoles for said motor units, no safety disconnect switch is provided.

SUMMARY OF THE INVENTION

In accordance with the present invention, there is provided a motor mount and console control, particularly for hospital beds, which includes a motor unit equipped with a splined male powered shaft or motor unit contained in a standardized motor drive housing which interlocks with a female splined socket arranged at a fixed motor mounting station on the bed with means to both support said motor unit and to activate the moving parts of the bed through a rotating screw member. In addition, the motor unit is held against rotational and lateral movement by a slot defined in a cross frame member of the bed and which carries an elastic cord attached to said frame member which is adapted to engage around and hold the motor housing in the slot. The motor unit also includes a housing for the drive gears with a single output shaft which may be connected to the female socket of the bed. The housing carries a gear connection to the output shaft from one or more motors and/or from a hand crank connection to provide a manual means for operating the bed in the event of power failure.

In addition, there is provided a console cabinet to house a plurality of said motor units, which is equipped with operational switches for an attendant's use. A still further feature of the present invention is a master switch which provides for safe access to the motor units for servicing and the like by shutting off all power when the console door is opened.

Accordingly, it is an object of the present invention to provide a device for mounting one or more motor drive units to a bed for rapidly connecting the unit to drive movable bed parts and which preferably includes a single shaft connection which permits either motor drive or hand drive of the movable bed part.

A further object of the present invention is to provide an improved type of control console to house a plurality of motor units, which is equipped with operational switches for use by an attendant and a master power disconnect switch to provide for safe access to said motor units.

A still further object is to provide both a motor mounting means and a control console which are simple in design, rugged in construction, and economical to manufacture.

For a better understanding of the present invention, its operating advantage and specific objects attained by the use, reference should be had to the accompanying drawings and descriptive matter where the preferred embodiment is illustrated.

BRIEF DESCRIPTION OF THE DRAWING

FIG. 4 is a section taken along line 4—4 of FIG. 3; and

FIG. 5 is a partial exploded side elevational view of the cross frame member with its motor mounting means, and the motor unit.

GENERAL DESCRIPTION OF THE PREFERRED EMBODIMENT

Figure 1:
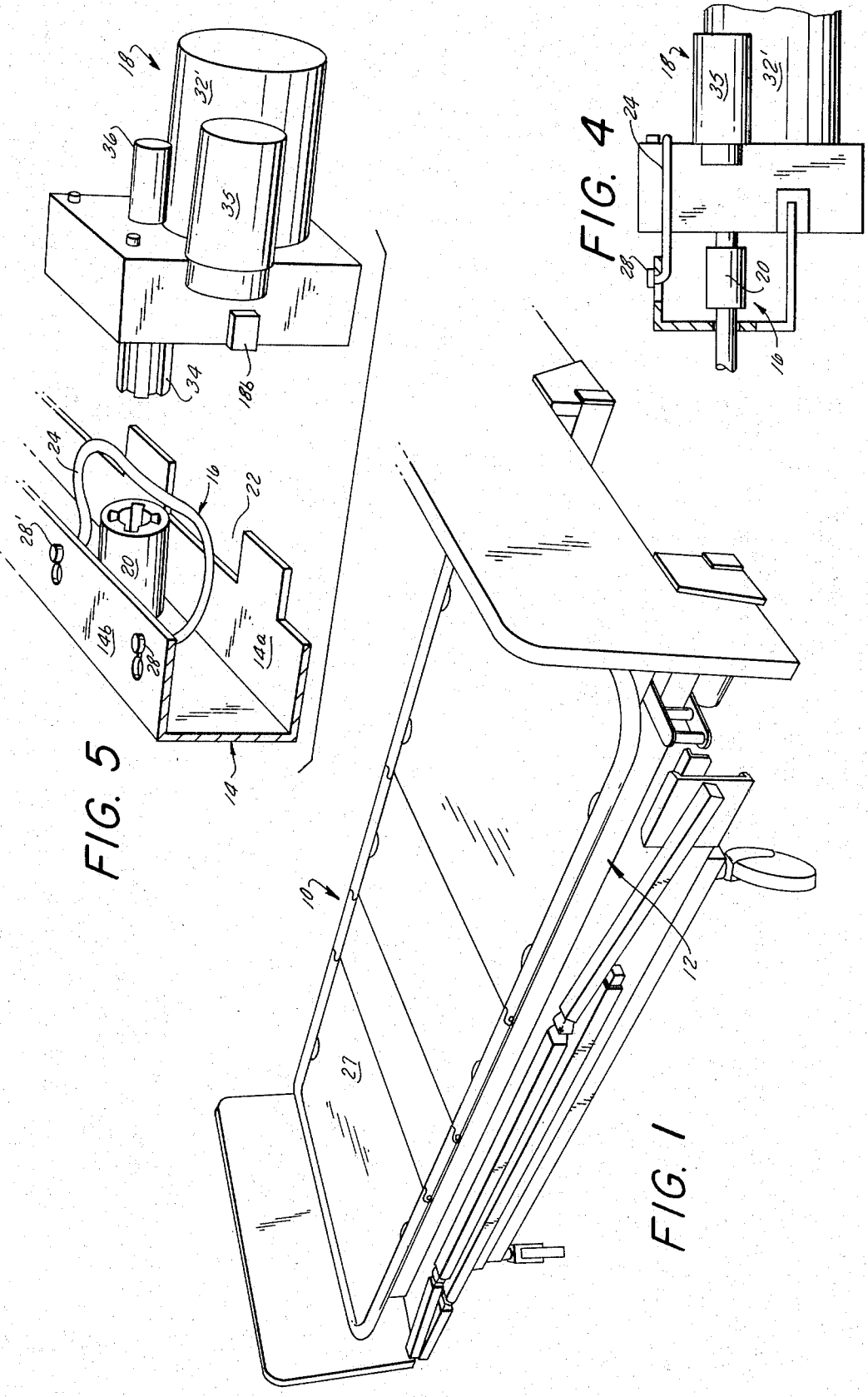
FIG. 1 is a partial top side perspective view of a hospital bed having a motor mount and control console constructed in accordance with the invention.
Figure 2:
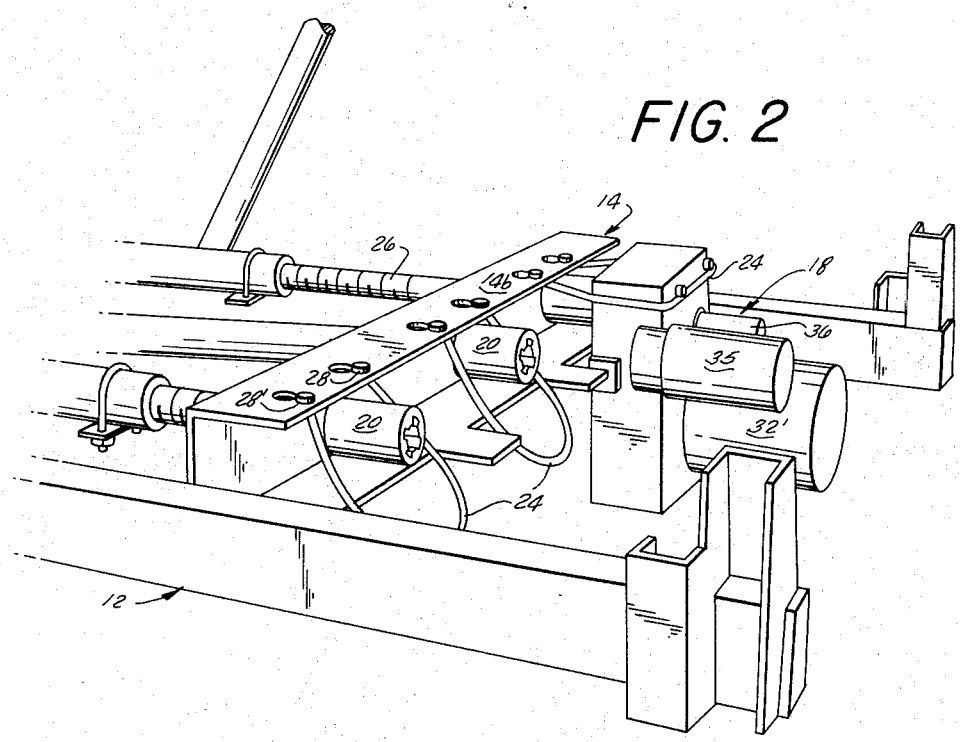
FIG. 2 is a partial top side perspective view of the front bed frame with an attached motor mounting means.

Referring to the drawings in particular, the invention embodied therein, comprises a bed generally designated 10, having a main frame 12 with cross frame member 14 which is provided with motor mounting means, generally designated 16, and a motor drive unit generally designated 18.

In accordance with the invention, the motor mounting means 16 comprises a female splined socket 20 and a motor receiving slot 22 in lower plate part 14a of the cross frame 14. A top plate part 14b carries an elastic cord 24 in a position to be engaged around the drive unit 18. Socket 20 is attached to screw member 26 of an operating part of the bed 12 for the purpose of raising and lowering or otherwise adjusting a mattress support 27 for example. Elastic cord 24 is provided with flanges 28 and 28' at its respective ends which fit into the wide part of key hole type slots 30 and 30' on the top plate part 14b of the frame member 14, and are secured by sliding them into the lower small part of the keyhole slot 30 as shown in FIG. 5.

The motor unit 18 is light enough to be mounted by hand and it includes a housing 18B which is provided with a first speed drive motor 32, a second speed drive motor 35 and a hand crank receiving socket 36, all of which are connected through gearing in the housing 18a to drive a splined male output shaft 34 which is engageable with the female socke 20. The shaft 34 is undersized in order to permit some radial and axial movement between the parts in order to prevent wearings. Studs or projections 38 and 38' prevent the elastic cord 24 from slipping off the motor unit 18 after it is engaged over the studs of the housing 18a. The motor unit 18 is supported by the interlocking of the male shaft 34 and the female socket 20 and is held from rotational and lateral movement by the bottom plate 16a bounding slot 22, and also by the elastic cord 24. An insulator pad 15 is carried on the housing 18B to insulate the unit electrically from the bed.

Figure 3:
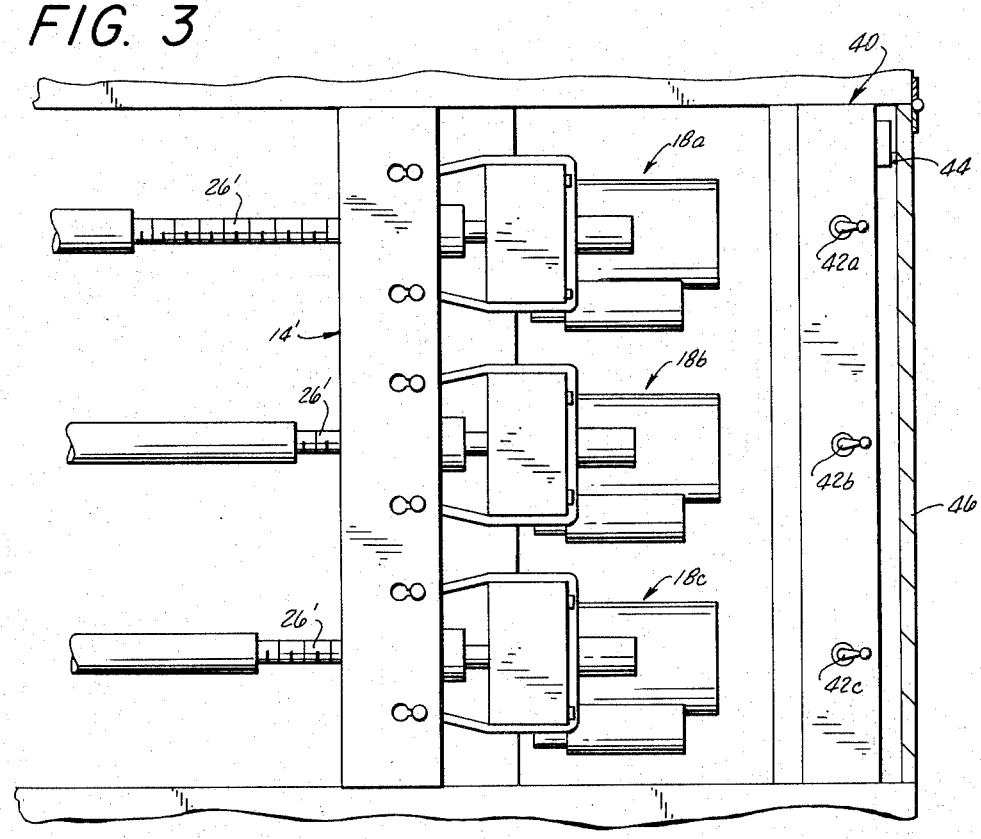
FIG. 3 is a front top plan view of the bed with a plurality of attached motor units and with a control console.

As shown in FIG. 3, a control console 40 is attached to the frame 12 and houses a plurality of motor units 18a, 18b and 18c. The control console is equipped with operational switches 42a, 42b and 42c for the respective motor units 18a, 18b, and 18c. In addition control console 40 is equipped with a master switch 44 which disconnects all power when console door 46 is completely open and thus provides for safe access to the motor units 18a, 18b and 18c for servicing and the like.

While a specific embodiment of the invention has been shown and described in detail to illustrate the application of the inventive principles, it will be understood that the invention may be embodied otherwise without departing from such principles.

What is claimed is:

1. A drive assembly for beds, particularly hospital beds having one or more moving parts operated by a rotatable member comprising a bed support member, a female drive socket rotatably supported on said member adapted to be connected to the rotatable member for operating the bed parts, a drive motor housing having at least one drive motor mounted thereon, said housing having a single output shaft connected to said motor and projecting outwardly from said housing, means on said female socket and said output shaft for connecting them together for rotation together when said output shaft is inserted into said female drive socket, and securing means on said bed support member for securing said drive motor housing to said support with said output shaft engaged with said female drive socket, said securing means including an elastic member engageable with said bed support member and extending around said motor housing.

2. A drive assembly according to claim 1, wherein said bed support member comprises a transverse channel member having a horizontal top plate part with two spaced slots, said elastic member having a plug at each end engaged in a respective slot.

3. A drive assembly according to claim 2, wherein said motor housing has a rear side which abuts against said top plate, and an opposite side of said housing having a projection, said elastic member extending below said projection around said housing.

4. A drive assembly according to claim 2, wherein said transverse channel part has a bottom plate part with an inwardly extending receiving recess into which said motor housing extends.

5. A drive assembly according to claim 1, wherein said motor housing includes a hand crank receiving socket engageable with a hand crank, which is connected to said output shaft.

6. A drive assembly according to claim 1, wherein said housing includes a rear side out of which said output shaft extends and a front side having said drive motor thereon connected to said output shaft through said housing, and a crank socket connected to rotate said output shaft independently of said motor and carried on said front side.

7. A drive assembly according to claim 1, including a plurality of drive motor housings, said bed support member having a plurality of spaced apart female drive sockets engaged with respective drive motor housings, and a control console mounted on said bed support member having means connected to said drive motors for selectively controlling said motors.

8. A drive assembly according to claim 7, wherein said console includes an access door, and switch means carried by said door for deactivating said motors when said door is opened.

* * * * *